(12) United States Patent
Jia et al.

(10) Patent No.: US 10,762,113 B2
(45) Date of Patent: Sep. 1, 2020

(54) CONVERSATIONAL KNOWLEDGE GRAPH POWERED VIRTUAL ASSISTANT FOR APPLICATION PERFORMANCE MANAGEMENT

(71) Applicant: Cisco Technology, Inc., San Jose, CA (US)

(72) Inventors: Kui Jia, Cupertino, CA (US); Harish Doddala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 15/885,018

(22) Filed: Jan. 31, 2018

(65) Prior Publication Data

US 2019/0236205 A1 Aug. 1, 2019

(51) Int. Cl.
*G06F 16/332* (2019.01)
*G10L 15/22* (2006.01)
*G06N 5/02* (2006.01)
*G06F 3/16* (2006.01)
*G10L 15/193* (2013.01)
*G06N 20/00* (2019.01)

(52) U.S. Cl.
CPC .......... *G06F 16/3329* (2019.01); *G06F 3/167* (2013.01); *G06N 5/02* (2013.01); *G06N 20/00* (2019.01); *G10L 15/193* (2013.01); *G10L 15/22* (2013.01)

(58) Field of Classification Search
CPC ..... G06F 16/3329; G06F 3/167; G06N 20/00; G06N 5/02; G10L 15/193; G10L 15/22
See application file for complete search history.

(56) References Cited

U.S. PATENT DOCUMENTS

| | | | | |
|---|---|---|---|---|
| 5,774,860 A | * | 6/1998 | Bayya | G10L 15/22 700/246 |
| 2014/0040748 A1 | * | 2/2014 | Lemay | G06F 3/167 715/728 |
| 2014/0222436 A1 | * | 8/2014 | Binder | G06F 3/167 704/275 |
| 2014/0365885 A1 | * | 12/2014 | Carson | G06F 3/167 715/708 |
| 2015/0066479 A1 | * | 3/2015 | Pasupalak | G06F 17/27 704/9 |
| 2015/0193379 A1 | * | 7/2015 | Mehta | G10L 15/00 704/9 |

(Continued)

*Primary Examiner* — Mohammad K Islam
(74) *Attorney, Agent, or Firm* — Behmke Innovation Group LLC; James M. Behmke; Jonathon P. Western

(57) ABSTRACT

In one embodiment, a method of processing a natural language input using a conversational knowledge graph in a virtual assistant is disclosed. The method includes receiving a natural language query from a user; translating the natural language query received from the user into corresponding intents; retrieving conversational knowledge context information based on the intents; using the retrieved conversational knowledge context information to customize back-end service calls to downstream applications; receiving a result of the customized back-end service calls; sending the result of the customized back-end service calls in a response to the natural language understanding system; translating the response from the fulfillment service system into a natural language response; and providing the natural language translated response to the user.

17 Claims, 7 Drawing Sheets

(56) References Cited

U.S. PATENT DOCUMENTS

| | | | |
|---|---|---|---|
| 2016/0110071 A1* | 4/2016 | Brown | G06F 3/165 |
| | | | 715/758 |
| 2016/0253434 A1* | 9/2016 | Yu | G06F 17/2785 |
| | | | 707/760 |
| 2017/0162197 A1* | 6/2017 | Cohen | G10L 25/63 |
| 2018/0068031 A1* | 3/2018 | Hewavitharana | G06F 16/9535 |
| 2018/0143967 A1* | 5/2018 | Anbazhagan | G06F 8/30 |
| 2018/0144046 A1* | 5/2018 | Braga | G06F 16/3329 |
| 2018/0165596 A1* | 6/2018 | Abrams | G06N 20/00 |
| 2018/0190272 A1* | 7/2018 | Georges | G10L 15/22 |
| 2018/0261203 A1* | 9/2018 | Zoller | G10L 13/027 |
| 2019/0027147 A1* | 1/2019 | Diamant | G06F 16/58 |
| 2019/0057693 A1* | 2/2019 | Fry | G10L 15/22 |
| 2019/0065498 A1* | 2/2019 | Yuan | G06N 5/027 |
| 2019/0065556 A1* | 2/2019 | Kumar | G06F 9/451 |
| 2019/0130286 A1* | 5/2019 | Salameh | G06N 5/022 |
| 2019/0156222 A1* | 5/2019 | Emma | G10L 15/22 |
| 2019/0236464 A1* | 8/2019 | Feinson | G06F 17/27 |
| 2019/0237068 A1* | 8/2019 | Canim | G06F 16/219 |
| 2019/0279627 A1* | 9/2019 | Wang | G10L 15/22 |
| 2019/0279633 A1* | 9/2019 | Venkata | G06F 3/167 |

\* cited by examiner

CONVERSATIONAL KNOWLEDGE GRAPH POWERED VIRTUAL ASSISTANT FOR APPLICATION PERFORMANCE MANAGEMENT

TECHNICAL FIELD

The present disclosure relates generally to application performance management (APM) virtual assistant, and, more particularly, to conversational knowledge graphs that enhance the intelligence of a virtual assistant for APM.

BACKGROUND

Traditionally, APM products have relied on a user interface specifically designed to leverage the proprietary techniques and tools underlying the APM products, which can vary from one vendor to another. In addition, the APM specific user interface requires the user to be technology savvy and learn the way each APM product monitor, capture, store and analyze application performance data. Thus, often times, the process of finding the desired answer or performing a meaningful action can involve a highly technical or non-intuitive set of user inputs. As a result, only those technology and APM savvy users may be able to effectively use the user interface of traditional APM products.

Furthermore, the relationship of the performance data is as important as the data itself and this isn't captured in most modern conversational systems in an intuitive manner. This makes it manual for most users to ask multiple questions to arrive at the desired outcome.

BRIEF SUMMARY

Examples of implementations of the disclosed technology can provide an intuitive and dynamic tool for processing a natural language input using a conversational knowledge graph in an APM virtual assistant. The disclosed process can be implemented as methods, systems, and a tangible, non-transitory, computer-readable medium storing program instructions that cause a computer to perform operations for processing a natural language input using a conversational knowledge graph. The methods, systems, and tangible, non-transitory, computer-readable medium can be implemented to include the following features: receiving, at a natural language understanding system of the virtual assistant, a natural language query from a user; translating, by the natural language system, the natural language query received from the user into corresponding intents; providing, by the natural language system, the intents to a fulfillment service system of the virtual assistant; sending, by the fulfillment service system, a request to a conversational knowledge graph system of the virtual assistant, to retrieve conversational knowledge context information from a conversational knowledge graph; using, by the fulfillment service system, the retrieved conversational knowledge context information to customize back-end service calls to downstream applications; sending, by the fulfillment service system, the customized back-end service calls to the downstream applications; receiving, by the fulfillment service system, a result of the customized back-end service calls; sending, by the fulfillment service system, the result of the customized back-end service calls in a response to the natural language understanding system; translating, by the natural language system, the response from the fulfillment service system into a natural language response; and providing the natural language translated response to the user.

The methods, systems, and tangible, non-transitory, computer-readable medium can also be implemented in various ways to include one or more of the following additional features. For example, the fulfillment service system can create on-demand recommendations using the contextual knowledge context information received from the conversational knowledge graph. The fulfillment service system can include the created on-demand recommendations in the response to the natural language understanding system. The natural language understanding system can translate the on-demand recommendations included in the response into natural language recommendation and provide the natural language translated on-demand recommendations to the user with the response. A conversational knowledge learning system can initialize the conversational knowledge graph using historic data or using human domain knowledge. The conversational knowledge learning system can combine inputs from the natural language understanding system and inputs from the downstream applications to execute a machine learning algorithm. The conversational knowledge learning system can identify most significant entities and strongest relationships between these entities. The conversational knowledge learning system can then update the conversational knowledge graph based on the executed machine learning algorithm.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
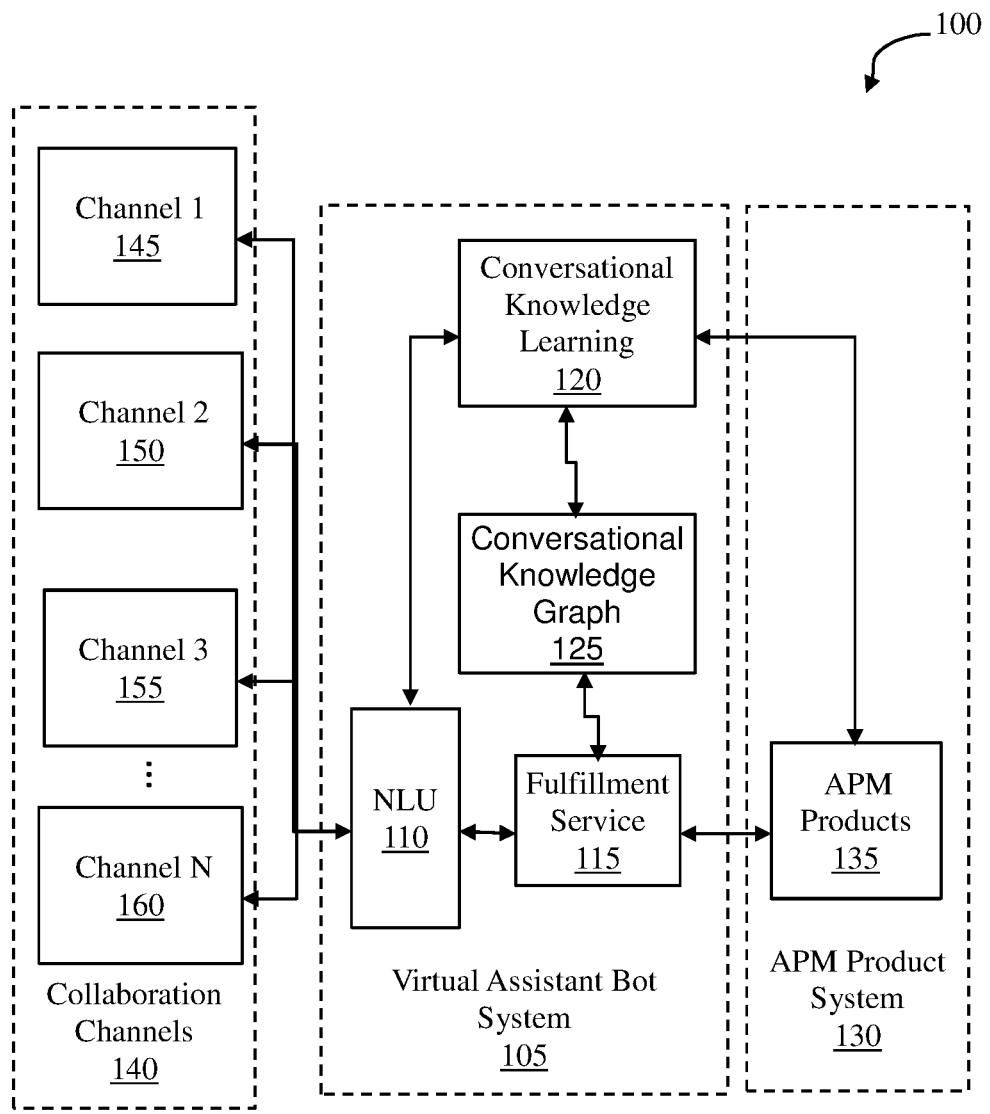
FIG. 1A is a block diagram of an exemplary architecture for an intelligent conversational assistant that adds conversational knowledge graph intelligence.

According to one or more embodiments of the disclosure, techniques herein provide for a conversational knowledge graph that enhance the intelligence of a APM virtual assistant. The disclosed techniques use a conversational knowledge graph to provide an intuitive user interface for APM with enhanced intelligence (the "conversational knowledge graph powered user interface for APM"). The conversational knowledge graph powered user interface can be implemented as an intelligent virtual assistant that can understand a user's intents from the user's natural language inputs. Based on the understood intents of the user, the conversational knowledge graph powered virtual assistant can assist the user to quickly find the right answers or perform a meaningful action on behalf of the user. The disclosed conversational knowledge graph powered APM virtual assistant can be implemented to possess a deep understanding of the user's intents and the related APM domain knowledge through artificial intelligence, machine learning, and deep learning, including various user assisted learning.

In one aspect, the disclosed techniques can be implemented in a conversational knowledge based intelligent virtual assistant by building a conversational interface. The disclosed techniques can be used to design the conversational interfaces to perform intelligent feature such as on-demand recommendation based upon the understanding of conversation context with user, pro-active reminder to the user based on the understanding of user's interest. These types of new features are much more dynamic and intelligent than the static or liner workflow such as merely translating various of natural language queries into different intents and utterances via natural language understanding (NLU), and then map the intents and utterances with different fulfillment service calls to either retrieve requested information or perform requested actions. The disclosed techniques provide for a conversation flow that is not pre-defined and works in a dynamic fashion to continuously improve the responses to the natural language queries. The disclosed techniques can be implemented to add conversational knowledge intelligence which is critical for APM virtual assistant.

Description

——Intelligent Conversational Assistant——

One important aspect of the disclosed techniques for implementing an intelligent conversational assistant is to create an assistant for monitoring systems (e.g., APM) that adds conversational knowledge intelligence relevant for monitoring systems. The disclosed intelligent conversational assistant provides a number of technical advantages. For example, the disclosed intelligent conversational assistant can provide real-time, on-demand recommendations across an entire conversation with the user by performing dynamic context tracking and analysis.

In another aspect, the disclosed architecture for intelligent conversational assistant implements a dynamic conversation workflow (i.e. request-response) that results in a flexible and scalable model that enriches the recommendations for the APM interface. These recommendations are more meaningful by always being within the context of conversation with the user. Accordingly, the disclosed intelligent conversational assistant for monitoring systems, such as APM avoids disconnected answers, repeating questions that the assistant needs to ask user again and again, in order to navigate the dialog with the user and to allocate the key answers or perform the actions that user really cares or wants.

The disclosed intelligent conversational assistant for monitoring systems, such as APM is able to understand the real meaning of user's question or enquiry by possessing and dynamically improving both the domain knowledge of the user applications, which are monitored by the monitoring system, such as APM products, and the understanding of the user. Moreover, the disclosed intelligent conversational assistant for monitoring systems, such as APM can learn to understand the questions and answers that matter the most to specific types of users and what actions these users are tasked to do, for example.

By leveraging artificial intelligence, machine learning, and deep learning, the disclosed intelligent conversational assistant for monitoring systems, such as APM possesses the intelligence to learn from the conversations with the users and becomes smarter over time.

FIG. 1A is a block diagram of an exemplary architecture for an intelligent conversational assistant (100) that adds conversational knowledge graph intelligence. The architecture (100) includes an intelligent conversational assistant system (105) that interfaces with and receives enquiries from collaboration channels (140). The intelligent conversational assistant for monitoring systems (105) processes the received enquiries to understand the intents of the users of the enquiries and interfaces with the monitoring systems, such as APM product system (130) to retrieve the answers or take actions that matches the understood intents.

The collaboration channels (140) can include different channels represented in the figure as channel 1 (145), channel 2 (150), channel 3 (155), and channel N (160). These channels can include various combinations of user interface tools and applications that allows users to provide text, voice, image, video, or a combination of these inputs in a conversational manner. Examples of such collaboration channels can include various social media, messenger, file sharing, and other applications that are available on different platforms including mobile, web, desktop, etc.

The monitoring system, such as an APM product system (130) can include different APM products represented in the figure as APM product (135). An example of the APM product (135) is further described with respect to FIG. 3 below, which illustrates an application intelligence platform as a system that monitors and collects metrics of performance data and application component vulnerabilities for an application environment being monitored. At the simplest structure, the application intelligence platform includes one or more agents and one or more servers/controllers that performs the performance monitoring.

The heart of the disclosed architecture for intelligent conversational assistant (100) is the intelligent conversational assistant system (105) that includes a conversational knowledge learning system (120) that dynamically improves the intelligence of the intelligent conversational assistant system (105) and a conversational knowledge graph system (125) that enables the understanding of the intents of the user from the received enquiries.

The conversational knowledge learning system (120) interfaces the APM products (135) to obtain domain knowledge of the user applications, which are monitored by the APM products (135). In addition, the conversational knowledge learning system (120) interfaces with a natural language understanding (NLU) system (110) to understand the different intents and utterances from the natural language queries processed by the NLU system (110). The conversational knowledge learning system (120) interfaces with the conversational knowledge graph system (125) to provide the each subsequently learned domain knowledge of the APM products (135) and the different intents and utterances from the user enquires to the conversational knowledge graph system (125). The conversational knowledge graph system (125) uses the additional learned knowledge received from the conversational knowledge learning system (120) to generate a new solution that satisfies the understood intents and utterances.

A fulfillment service system (115) interfaces with the NLU system (110), the conversational knowledge graph system (125), and the APM products (135) to provide the desired answer or action based on the solution generated by the conversational knowledge graph system (125).

With each subsequent use, the conversational knowledge learning system (120) enables the conversational knowledge graph system (125) to become smarter through updates to dynamically improve the solution generation. Thus, the entire intelligent conversational assistant system (105) becomes smarter over time.

——Conversational Knowledge Graph——

Figure 1B:
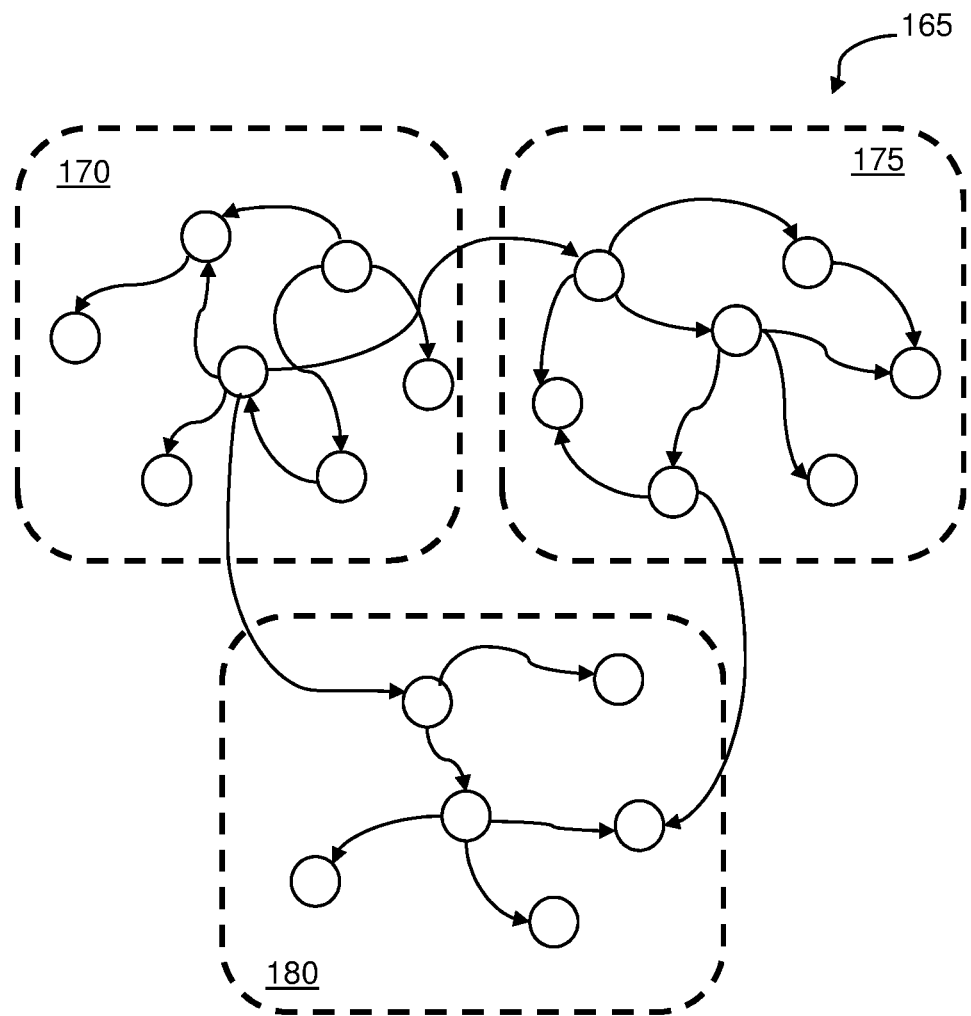
FIG. 1B is a process flow diagram of an exemplary conversational knowledge graph that can be implemented in the conversational knowledge graph system of FIG. 1A.

FIG. 1B is a process flow diagram of an exemplary conversational knowledge graph (165) that can be implemented in the conversational knowledge graph system (125). The conversational knowledge graph (165) is a kernel of this new solution. The conversational knowledge graph (165) can be viewed as a flexible entity graph as illustrated in FIG. 1B, which includes nodes (circles), edges (arrows) and properties (not shown). Each node in the graph (165) represents a core entity (think of a "topic") for a conversation that user is interested in, such as total sales from an e-commerce app. Each node has a list of properties to further describe the entity it represents, such as name and description or definition, the query template of where and how to retrieve this data, a set of meta data to enrich the query result (such as column name or unit of measure . . . ), a preferred chart type, . . . etc. Entity nodes in the graph (165) can be connected with each other via edges which define the relationships between the connected entities in the context of a conversation. In the graph (165), conversations (170), (175), and (180) are represented by dotted squares or rectangles. Any number of relationships can be represented by the graph. This relationship is leveraged in a conversation to constantly enhance the output based on the intent. One example conversation (170) related to APM products can be associated with business transactionsrelated entity nodes such as total sales, total customers, total orders, sales by category, order average, unique shopping sessions, and customer segments. The business transactions related conversation (170) can be associated with an APM metric conversation (175) with performance metric entity nodes such as calls per minute, total errors, exit calls per minute, CPU utilization, memory utilization, network security, and average response time. A third exemplary conversation can be related APM actions (180) to be taken for the business transaction conversation (170) and the APM metric conversation (175). APM actions can be represented by entities such as war room actions, meeting actions, ticketing actions, analytics actions, cloud service autoscaling actions, and data center server orchestration actions.

For example, in the business transactions conversation 170, the total customers entity node can be connected with the total sales entity node with a contribute edge. An edge is directional (think of an arrow connection with "from" and "to" information) so any two nodes in the graph (165) can have multiple edges with different directions. Each edge has its own property such as importance ranking score (which can be normalized to a value between 0 to 1), this special property represents a quantifiable rating between two conversation entities. A higher property value of an edge connecting the two nodes indicates a closer relationship between this two entity nodes in the context of the conversation.

Leveraging conversational knowledge graph (165) in the architecture for intelligent conversational assistant (100) enables important benefits such as on-demand recommendation. Because related entity nodes (circles) are connected together with edges (arrows), a graph client can easily retrieve all the related entity nodes for a given entity node. For example, a request can be made to the conversational knowledge graph (165) to retrieve all the business metrics that contribute to the given metrics—total sales—by using the edge type—contribute—. Responsive to the request, a list of related metrics such as—total orders—entity and—total customers—entity can be returned as part of the contextual knowledge. The fulfillment service system (115) can then cache these related entities as well as their relationship type and importance scores locally. When the fulfillment service system (115) determines that the value of—total sale—of last hour is declining, the fulfillment service system can quickly recommend to the user to check the related—total orders—entity or—total customers—entity as a way to drill down and find the root cause of sales declining.

——Machine Learning Updates of Conversational Knowledge Graph——

The conversational knowledge graph (165) is a dynamic graph that can be updated using machine learning, for example. The conversational knowledge graph (165) can be initially set up manually with some human domain knowledge or initial analysis results from APM historical data. Machine learning starts when real conversations with user begins. A machine learning engine in the conversational knowledge learning system (120) combines the inputs, such as NLU activity logs, from the NLU system (110) and inputs, such as APM knowledge base, from the APM products (135) to execute unsupervised or supervised or both machine learning algorithms. The machine learning algorithms are used to identify the most significant entities (represented as nodes) and the strongest relationships (represented as edges) with other entities. The result of the machine learning process is used to update or adjust the conversational knowledge graph (165) implemented in the conversational knowledge graph system (125).

——User Interactions with Intelligent Conversational Assistant System——

A given user can interact with the intelligent conversational assistant system (105) via one or more collaboration channels (145, 150, 155, 160) to input a query using natural language format. The NLU system (110) of the intelligent conversational assistant system (105) translates the natural language input received from the user into corresponding intents. The intents of the user determined from the natural language input are passed to the fulfillment service system (115). Before the fulfillment service system (115) can request back-end service calls to the APM products (135), the fulfillment service system (115) sends a request to the conversational knowledge graph system (125) to retrieve the conversational knowledge context from the conversational knowledge graph (165). The fulfillment service system (115) uses the conversational knowledge context to customize the back-end service calls to downstream APM products (135). Before the fulfillment service system (115) can return a response to the NLU system (110) based on the results of the back-end service calls to the APM products (135), the fulfillment service system (115) can also use the contextual knowledge received from the graph (165) to build corresponding recommendations on-demand. Such on-demand recommendations can be included in the eventual response to the NLU system (110). The NLU system (110) translates the on-demand recommendations into natural language sentences before providing to the user through the collaboration channels (145, 150, 155, 160).

——Exemplary Processes for Implementing the Disclosed Techniques——

Figure 2A:
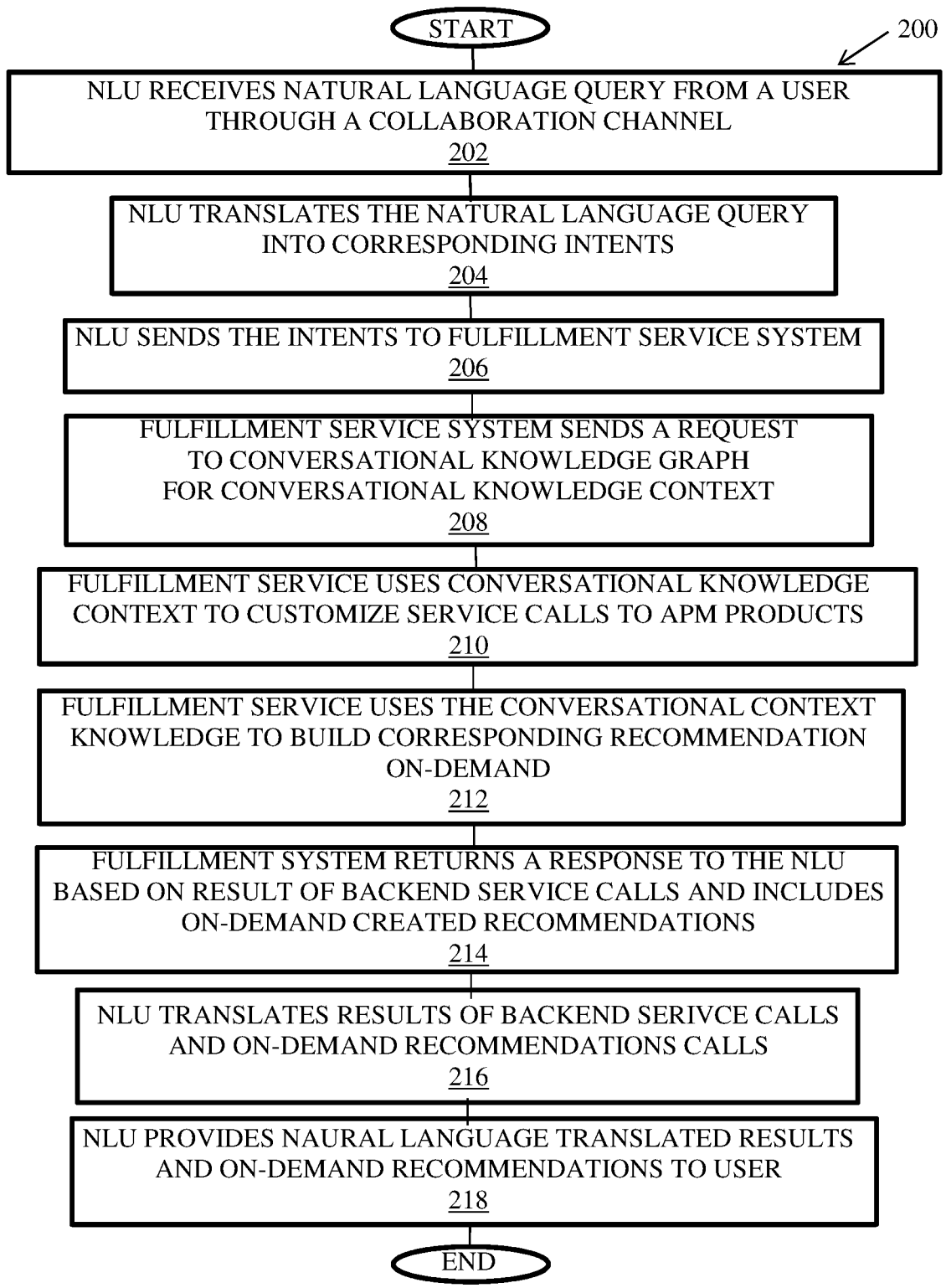
FIG. 2A is a process flow diagram of an exemplary process for processing natural language input using the conversational knowledge graph powered APM virtual assistant as disclosed herein.

FIG. 2A is a process flow diagram of an exemplary process (200) for processing natural language input using the conversational knowledge graph powered APM virtual assistant as disclosed herein. The process (200) includes receiving, at the NLU system, a natural language query from a user through a collaboration channel (202). The NLU system translates the natural language input received from the user into corresponding intents (204). The intents of the user determined from the natural language input are passed to the fulfillment service system (206). The fulfillment service system sends a request to the conversational knowledge graph system to retrieve the conversational knowledge context from the conversational knowledge graph (208). The fulfillment service system uses the retrieved conversational knowledge context to customize the back-end service calls to downstream APM products (210). The fulfillment service system can also use the contextual knowledge received from the conversational knowledge graph to build corresponding recommendations on-demand (212). The fulfillment service system can return a response to the NLU system based on the results of the back-end service calls to the APM products and includes the on-demand recommendations in the eventual response to the NLU system (214). The NLU system translates the on-demand recommendations and results of the back-end service calls into natural language sentences (216) and provides the natural language sentence translated on-demand recommendations and results of the back-end service calls (218).

——Exemplary Processes for Machine Learned Improvements to the Conversational Knowledge Graph——

Figure 2B:
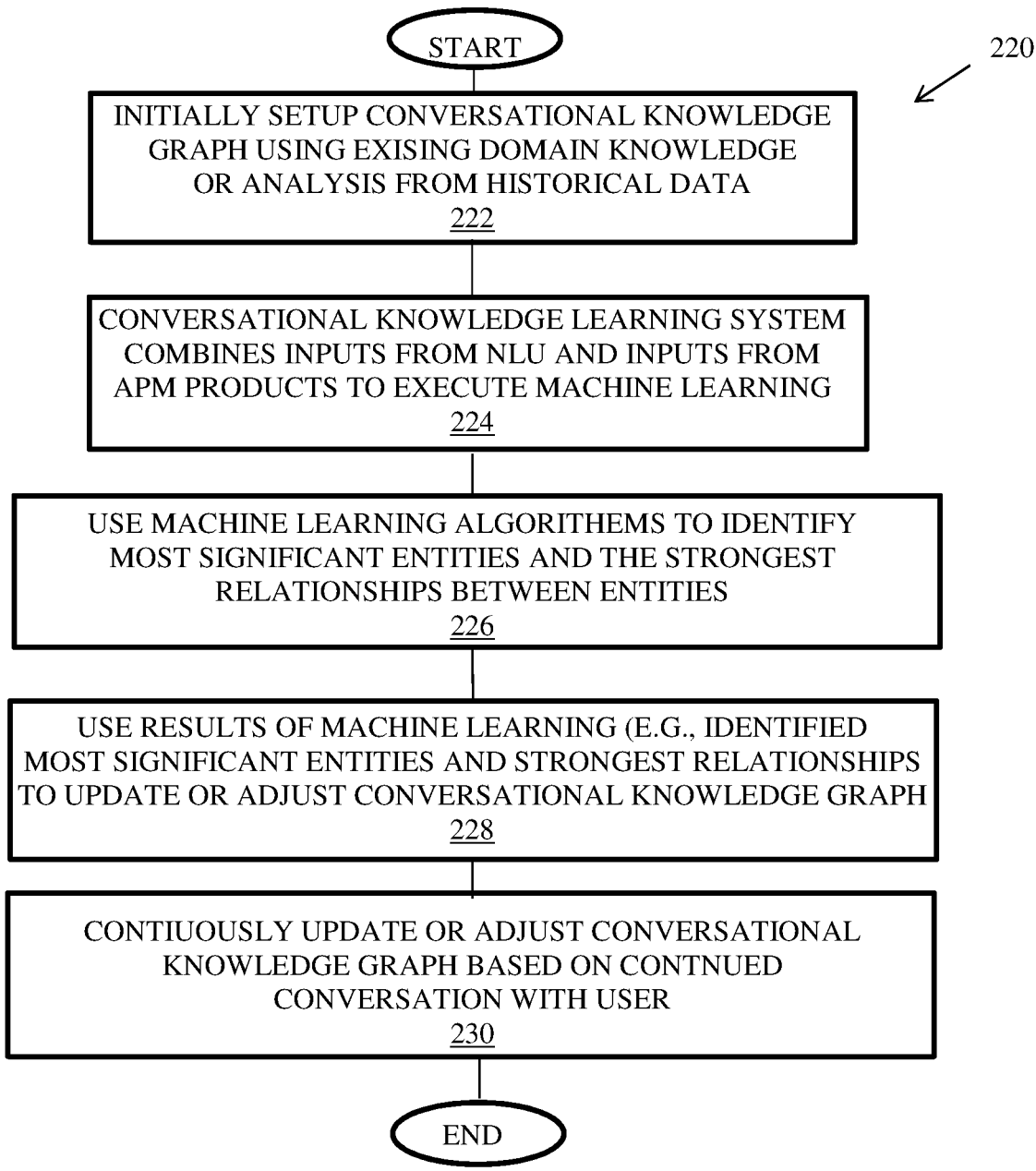
FIG. 2B is a process flow diagram of an exemplary process for using machine learning to continuously improve the conversational knowledge graph powered APM virtual assistant as disclosed herein.

FIG. 2B is a process flow diagram of an exemplary process 220 for using machine learning to continuously improve the conversational knowledge graph powered APM virtual assistant as disclosed herein. The process 220 includes using machine learning to dynamically and continuously update and improve the conversational knowledge graph. The conversational knowledge graph can be initially set up manually with some human domain knowledge or initial analysis results from APM historical data (222). Machine learning starts when real conversations with user begins. A machine learning engine in the conversational knowledge learning system combines the inputs, such as NLU activity logs, from the NLU system and inputs, such as APM knowledge base, from the APM products to execute unsupervised or supervised or both machine learning algorithms (224). The machine learning algorithms are used to identify the most significant entities (represented as nodes) and the strongest relationships (represented as edges) with other entities (226). The result of the machine learning process is used to update or adjust the conversational knowledge graph implemented in the conversational knowledge graph system (228). With each conversation with the user, the conversational knowledge graph is subsequently and continuously updated or adjusted (230). In such manner, the conversational knowledge graph becomes smarter with continuous use.

——Exemplary Technical Applications of the Disclosed Techniques——

Figure 2C:
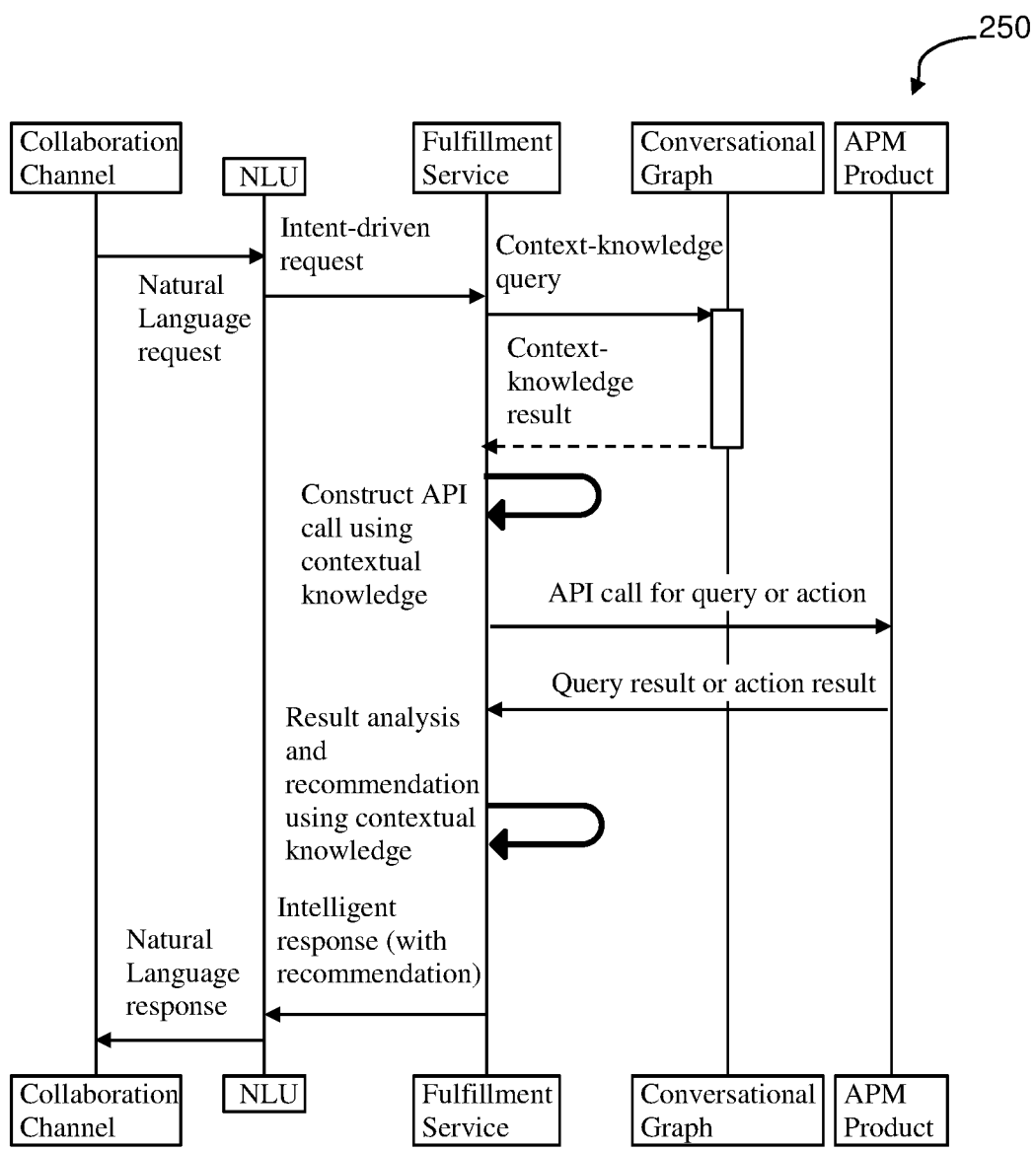
FIG. 2C is an exemplary process flow diagram of an exemplary workflow process for using the disclosed techniques for processing natural language input using the conversational knowledge graph powered APM virtual assistant.

FIG. 2C is an exemplary process flow diagram of an exemplary workflow process (250) for implementing the disclosed techniques. The exemplary workflow process (250) flows from left to right beginning with the Collaboration Channel as illustrated in FIG. 2C.

For example, a user can use a collaboration channel to submit a natural language request to the NLU system. The natural language request can be a voice or text input for a question such as "how is my app business performance for the last hour?" The NLU system of the intelligent conversational assistant translates the natural language sentence into a pre-defined intent construct and extracts [my app] entity and [business performance] entity as well as a time filter [last hour]. The NLU system sends these identified entities with related time filter as an intent-driven request to the fulfillment service system. The fulfillment service system uses the identified entities in the intent-driven request to construct a conversational context-knowledge query and sends the constructed conversational context-knowledge query to the conversational knowledge graph. Since the conversational knowledge graph already stores the knowledge about the users, their apps, and the key business metrics which users had selected to describe the business performance of their app, the conversational knowledge graph returns to the fulfillment service with a result of the customized query with the proper parameter values pre-populated and a specific API endpoint for the customized query. The fulfillment service can now use this context-driven knowledge result received on-demand from the context knowledge graph to conduct the API call with APM product backend APIs. The result of the backend API call as well as the on-demand recommendation for this result of the back-end are sent back to NLU system, and the NLU system translates the response with next step recommendation and send back to the user as natural language response through the collaboration channel.

——Exemplary Technical Solutions & Advantages for Technical Problems——

The disclosed techniques provide an intelligent graph-based recommendation engine that is able to understand the intents of a user's request. The disclosed techniques can be used to provide an intelligent conversational assistant with flexibility to represent conversational entities into a dynamic knowledge graph. In addition, the disclosed techniques provide a flexible and scalable model to enrich the recommendations that are critical to APM products. The enriched recommendations are made more meaningful by always being within the context of conversation with the user. In addition, the conversational knowledge powered APM virtual assistant is an intuitive way to connect the user to the application and information technology monitoring domain knowledge.

In some implementations, the conversational knowledge graph as disclosed herein can be combined with a conversational interface to provide the capability to the user to intelligently interact with complex systems, such as APM products.

In some implementations, the disclosed techniques reinforce learning to avoid pitfalls of static graph (i.e., stale knowledge) to improve the responses to user queries over time.

In some implementations, recommendations are constantly enhanced based on the parameters that change over time. In a dynamic environment that is a result of a rapidly evolving industry such as in the IT infrastructure, application monitoring and operations domain, utilizing a dynamic graph powered by reinforcement learning is critically important. The learning provides the adaptive parameters necessary to constantly enhance the outputs.

As described herein, the disclosed techniques can be implemented to provide an intelligent conversational assistant system that interfaces with an APM product. An exemplary APM product is described in terms of an APM Platform with respect to FIG. 3. Among other things, the Application Performance Management Platform can be used to monitor performance within a networking environment, specifically by monitoring applications and entities (e.g., transactions, tiers, nodes, and machines) in the networking environment using agents installed at individual machines at the entities.

——Application Intelligence Platform——

The embodiments herein relate to an application intelligence platform for application performance management. In one aspect, as discussed with respect to FIG. 3 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data. The disclosed intelligent conversational assistant system (105) can interface with the APM platform 300 to provide on-demand recommendation and answers to user queries as described herein.

Figure 3:
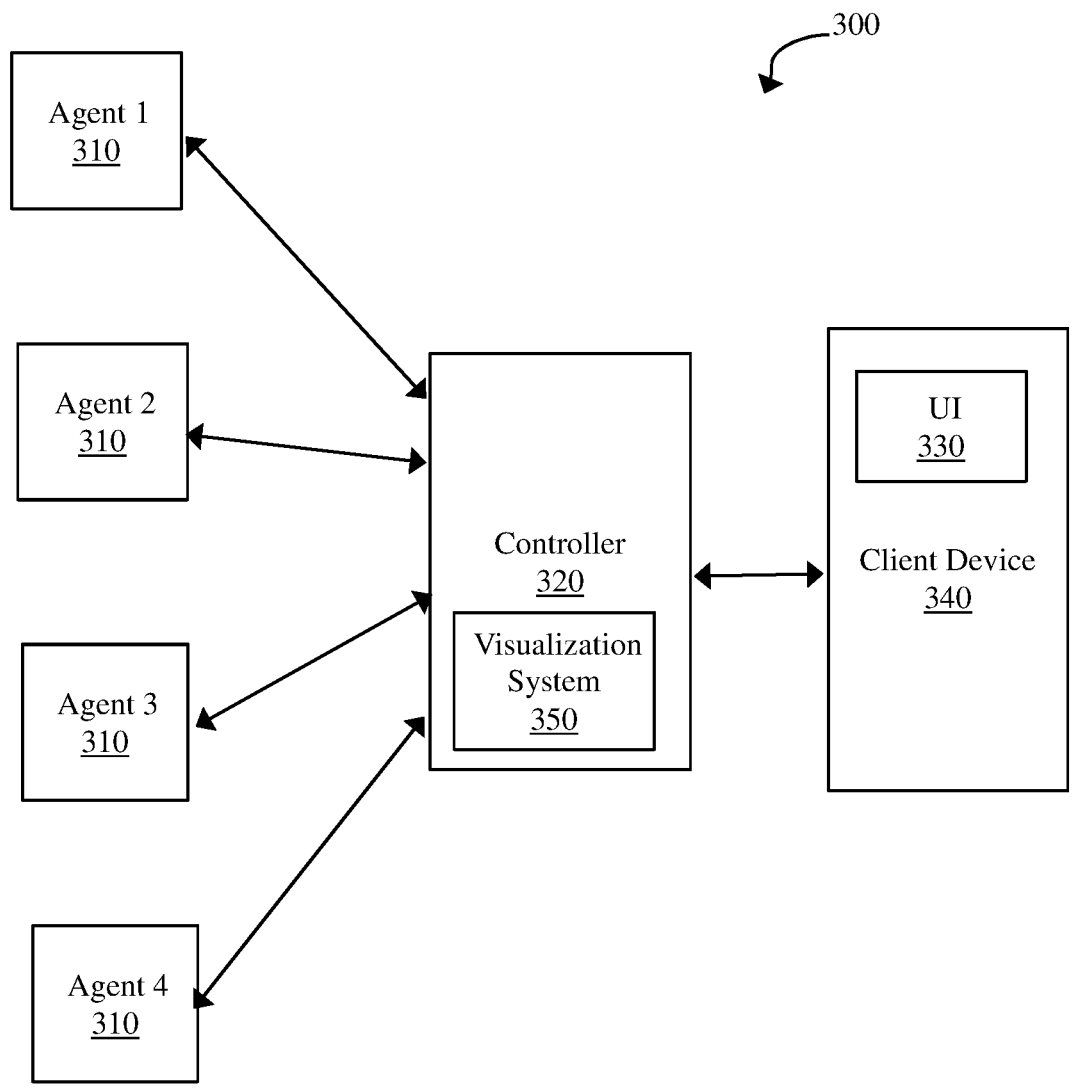
FIG. 3 illustrates an example application performance management platform.

FIG. 3 is a block diagram of an example application intelligence platform 300 that can implement one or more aspects of the techniques herein. The application intelligence platform is a system that monitors and collects metrics of performance data and application component vulnerabilities for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics and application component vulnerabilities from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data and application component vulnerabilities in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance and application component vulnerability monitoring can be oriented by business transaction to focus on the performance and application component vulnerability of the services in the application environment from the perspective of end users. Performance and application component vulnerability monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance and application component vulnerability information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems or application component vulnerability are occurring or detected or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
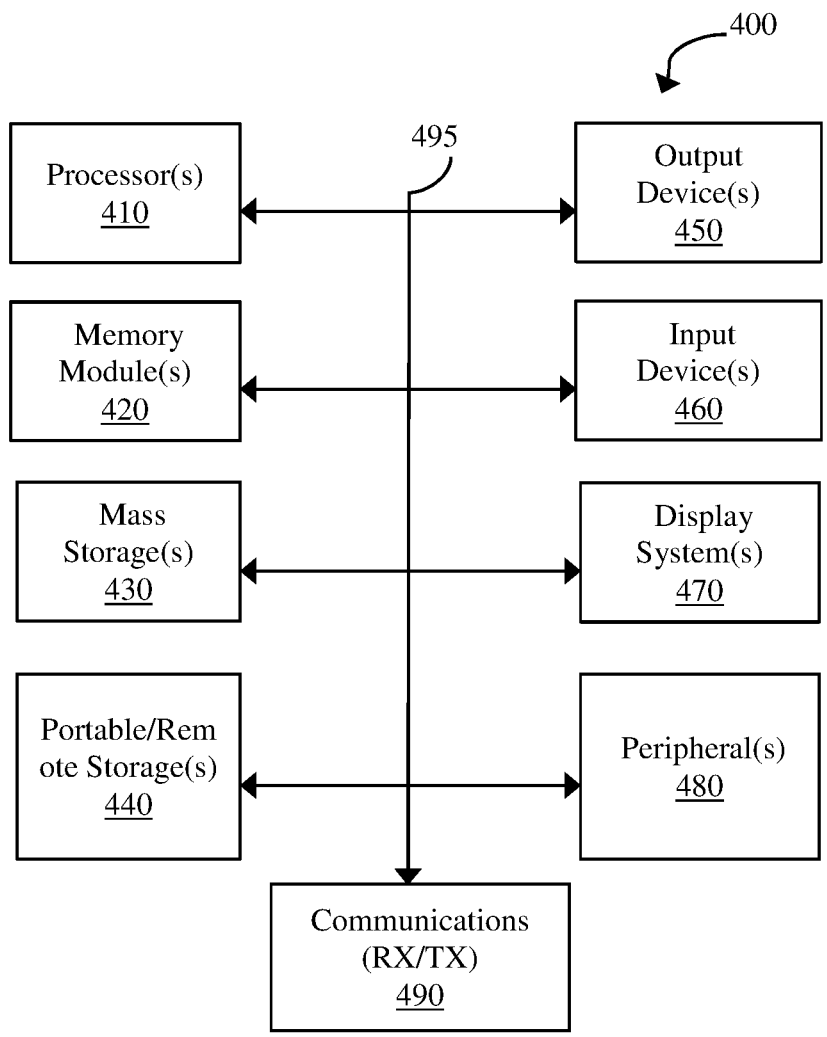
FIG. 4 illustrates an example computing system implementing the disclosed technology.

FIG. 4 is a block diagram of a computer system 400 for implementing the present technology, which is a specific implementation of agents (e.g., on application servers), controller (e.g., on same or separate servers), and client device of FIG. 3 above. Note that the specifically configured system 400 of FIG. 4 is not meant to be mutually exclusive, and the techniques herein may be performed by any suitably configured computing device.)

The computing system 400 of FIG. 4 includes one or more processors 410 and memory 420. Main memory 420 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable or remote storage device 540, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a compact disk, digital video disk, magnetic disk, flash storage, etc. to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD) or other suitable display device. Display system 470 receives textual and graphical information and processes the information for output to the display device.

Peripherals 480 may include any type of computer support device to add additional functionality to the computer system. For example, peripheral device(s) 480 may include a modem or a router.

The components contained in the computer system 400 of FIG. 4 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 400 of FIG. 4 may include one or more antennas, radios, and other circuitry for communicating over wireless signals, such as for example communication using Wi-Fi, cellular, or other wireless signals.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

What is claimed is:

1. A method for processing a natural language input using a conversational knowledge graph in a virtual assistant, the method including:
    receiving, at a natural language understanding system of the virtual assistant, a natural language query from a user;
    translating, by the natural language understanding system, the natural language query received from the user into corresponding intents;
    providing, by the natural language understanding system, the intents to a fulfillment service system of the virtual assistant;
    sending, by the fulfillment service system, a request to a conversational knowledge graph system of the virtual assistant, to retrieve conversational knowledge context information from a conversational knowledge graph;
    using, by the fulfillment service system, the retrieved conversational knowledge context information to customize back-end service calls to an application performance monitoring (APM) product configured to monitor performance of one or more applications;
    sending, by the fulfillment service system, the customized back-end service calls to the APM product, causing the APM product to execute the customized back-end service calls;
    receiving, by the fulfillment service system, a result of the APM product executing the customized back-end service calls;
    sending, by the fulfillment service system, the result of the APM product executing the customized back-end service calls in a response to the natural language understanding system;
    translating, by the natural language understanding system, the response from the fulfillment service system into a natural language response; and
    providing the natural language translated response to the user,
    wherein the conversational knowledge graph comprises a plurality of conversations related to the APM product, each conversation of the conversational knowledge graph including a plurality of entities of interest to the user within a context of the respective conversation, and the plurality of conversations including, at least, a first conversation associated with metrics of the APM product, and
    wherein the method further comprises:
        detecting, by the fulfillment service system, a change in a first metric of the APM product in the first conversation;
        in response to detecting the change in the first metric of the APM product, creating, by the fulfillment service system, an on-demand recommendation for the user based on the conversational knowledge context information received from the conversational knowledge graph, wherein the on-demand recommendation recommends an action to be taken by the user using the APM product, the action to be taken relating to one or more second metrics of the APM product in the first conversation that contribute to the first metric of the APM product; and
        including, by the fulfillment service system, the created on-demand recommendation in the natural language translated response provided to the user.

2. The method of claim 1, including:
  translating, by the natural language understanding system, the on-demand recommendations included in the response into natural language recommendation; and
  providing the natural language translated on-demand recommendations to the user with the response.

3. The method of claim 1, including:
  initializing the conversational knowledge graph.

4. The method of claim 3, wherein initializing the conversational knowledge graph includes:
  using historic data to initialize the conversational knowledge graph.

5. The method of claim 3, wherein initializing the conversational knowledge graph includes:
  using human domain knowledge to initialize the conversational knowledge graph.

6. The method of claim 3, including:
  combining inputs from the natural language understanding system and inputs from the APM product to execute a machine learning algorithm.

7. The method of claim 6, including:
  identifying most significant entities and strongest relationships with other entities.

8. The method of claim 6, including:
  updating the conversational knowledge graph based on the executed machine learning algorithm.

9. A virtual assistant system for processing a natural language input using a conversational knowledge graph, the system including:
  a natural language understanding system that interfaces with a collaboration channel to receive natural language user query and translate the natural language query received from the user into corresponding intents;
  a fulfillment service system communicatively linked with the natural language understanding system to receive the intents from the natural language understanding system; and
  a conversational knowledge graph system communicatively linked with the fulfillment service system to provide conversational knowledge context information from a conversational knowledge graph to the fulfillment service system;
  wherein the fulfillment service system is configured to use the conversational knowledge context information to send customized back-end service calls to an application performance monitoring (APM) product configured to monitor performance of one or more applications, causing the APM product to execute the customized back-end service calls, receive a result of the APM product executing the customized back-end service calls, and provide a response to the natural language understanding system based on the received result;
  wherein the natural language understanding system is configured to translate the response from the fulfillment service system into a natural language response and provide the natural language translated response to the user through the collaboration channel;
  wherein the conversational knowledge graph comprises a plurality of conversations related to the APM product, each conversation of the conversational knowledge graph including a plurality of entities of interest to the user within a context of the respective conversation, and the plurality of conversations including, at least, a first conversation associated with metrics of the APM product; and
  wherein the fulfillment service system is further configured to:
    detect a change in a first metric of the APM product in the first conversation,
    in response to detecting the change in the first metric of the APM product, create an on-demand recommendation for the user based on the conversational knowledge context information received from the conversational knowledge graph, wherein the on-demand recommendation recommends an action to be taken by the user using the APM product, the action to be taken relating to one or more second metrics of the APM product in the first conversation that contribute to the first metric of the APM product, and
    include the created on-demand recommendation in the natural language translated response provided to the user.

10. The system of claim 9, wherein the natural language understanding system is configured to perform operations including:
  translate the on-demand recommendations included in the response into natural language recommendation; and
  provide the natural language translated on-demand recommendations to the user with the response.

11. The system of claim 9, including:
  a conversational knowledge learning system communicatively linked with the conversational knowledge graph system to initialize the conversational knowledge graph.

12. The system of claim 11, wherein the conversational knowledge learning system is configured to initialize the conversational knowledge graph using historic data.

13. The system of claim 11, wherein the conversational knowledge learning system is configured to initialize the conversational knowledge graph using human domain knowledge.

14. The system of claim 11, wherein the conversational knowledge learning system is configured to combine inputs from the natural language understanding system and inputs from the APM product to execute a machine learning algorithm.

15. The system of claim 14, wherein the conversational knowledge learning system is configured to identify most significant entities and strongest relationships with other entities.

16. The system of claim 14, wherein the conversational knowledge learning system is configured to update the conversational knowledge graph based on the executed machine learning algorithm.

17. A tangible, non-transitory, computer-readable medium storing program instructions that cause a computer to perform operations for processing a natural language input using a conversational knowledge graph, the operations including:
  receiving, at a natural language understanding system of a virtual assistant, a natural language query from a user;
  translating, by the natural language understanding system, the natural language query received from the user into corresponding intents;
  providing, by the natural language understanding system, the intents to a fulfillment service system of the virtual assistant;
  sending, by the fulfillment service system, a request to a conversational knowledge graph system of the virtual assistant, to retrieve conversational knowledge context information from a conversational knowledge graph;

using, by the fulfillment service system, the retrieved conversational knowledge context information to customize back-end service calls to an application performance monitoring (APM) product configured to monitor performance of one or more applications;

sending, by the fulfillment service system, the customized back-end service calls to the APM product, causing the APM product to execute the customized back-end service calls;

receiving, by the fulfillment service system, a result of the APM product executing the customized back-end service calls;

sending, by the fulfillment service system, the result of the APM product executing the customized back-end service calls in a response to the natural language understanding system;

translating, by the natural language understanding system, the response from the fulfillment service system into a natural language response; and providing the natural language translated response to the user, wherein the conversational knowledge graph comprises a plurality of conversations related to the APM product, each conversation of the conversational knowledge graph including a plurality of entities of interest to the user within a context of the respective conversation, and the plurality of conversations including, at least, a first conversation associated with metrics of the APM product, and wherein the method further comprises:

detecting, by the fulfillment service system, a change in a first metric of the APM product in the first conversation;

in response to detecting the change in the first metric of the APM product, creating, by the fulfillment service system, an on-demand recommendation for the user based on the conversational knowledge context information received from the conversational knowledge graph, wherein the on-demand recommendation recommends an action to be taken by the user using the APM product, the action to be taken relating to one or more second metrics of the APM product in the first conversation that contribute to the first metric of the APM product; and including, by the fulfillment service system, the created on-demand recommendation in the natural language translated response provided to the user.

\* \* \* \* \*